(12) United States Patent
Tang et al.

(10) Patent No.: US 11,383,483 B2
(45) Date of Patent: Jul. 12, 2022

(54) MULTILAYER FOAM FILMS AND METHODS FOR MAKING THE SAME

(71) Applicant: ExxonMobil Chemical Patents Inc., Baytown, TX (US)

(72) Inventors: Qi Tang, Shanghai (CN); Stefan B. Ohlsson, Keerbergen (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/252,847

(22) PCT Filed: Jul. 9, 2019

(86) PCT No.: PCT/US2019/041007
§ 371 (c)(1),
(2) Date: Dec. 16, 2020

(87) PCT Pub. No.: WO2020/023207
PCT Pub. Date: Jan. 30, 2020

(65) Prior Publication Data
US 2021/0260849 A1 Aug. 26, 2021

Related U.S. Application Data

(60) Provisional application No. 62/703,697, filed on Jul. 26, 2018.

(51) Int. Cl.
| | |
|---|---|
| *B32B 5/18* | (2006.01) |
| *B32B 27/06* | (2006.01) |
| *B32B 27/08* | (2006.01) |
| *B32B 27/18* | (2006.01) |
| *B32B 27/32* | (2006.01) |
| *C08J 9/00* | (2006.01) |

(52) U.S. Cl.
CPC .............. *B32B 5/18* (2013.01); *B32B 27/065* (2013.01); *B32B 27/08* (2013.01); *B32B 27/18* (2013.01); *B32B 27/327* (2013.01); *C08J 9/0061* (2013.01); *B32B 2250/242* (2013.01); *B32B 2250/40* (2013.01); *B32B 2266/025* (2013.01); *B32B 2307/54* (2013.01); *B32B 2307/581* (2013.01); *B32B 2307/72* (2013.01); *B32B 2439/70* (2013.01); *C08J 2323/06* (2013.01); *C08J 2423/06* (2013.01); *C08J 2423/08* (2013.01)

(58) Field of Classification Search
CPC ..... B32B 5/18; B32B 27/065; B32B 2250/40; B32B 27/327; C08J 9/0061; C08J 2323/06; C08J 2423/06
See application file for complete search history.

(56) References Cited

U.S. PATENT DOCUMENTS

| | | |
|---|---|---|
| 4,657,811 A | 4/1987 | Boyd et al. |
| 5,261,536 A | 11/1993 | Wilson |
| 6,132,827 A | 10/2000 | Miro |
| 8,247,065 B2 | 8/2012 | Best et al. |
| 2016/0137804 A1 | 5/2016 | Van der Ven et al. |
| 2020/0325313 A1 | 10/2020 | Wang et al. |

*Primary Examiner* — Hai Vo
(74) *Attorney, Agent, or Firm* — ExxonMobil Chemical Patents Inc.—Law Department

(57) ABSTRACT

Multilayer foam films including a core layer and two skin layers, (i) the core layer including the product of the combination of an LDPE composition, at least one blend partner and at least one foaming agent; and (ii) the two skin layers each independently including the product of the combination of an ethylene 1-hexene copolymer and at least one additive; wherein the core layer is disposed between the two skin layers, are provided. Methods for making the multilayer foam films are also provided.

18 Claims, 6 Drawing Sheets

MULTILAYER FOAM FILMS AND METHODS FOR MAKING THE SAME

CROSS-REFERENCE OF RELATED APPLICATIONS

This application is a National Phase Application claiming priority to PCT Application Serial No. PCT/US2019/041007, filed Jul. 9, 2019, which claims the benefit of Ser. No. 62/703,697, filed Jul. 26, 2018, the disclosures of which are hereby incorporated by reference in their entireties.

FIELD OF THE INVENTION

The present disclosure relates to foam films, and more particularly relates to multilayer foam films comprising polyethylene compositions and methods for making those films.

BACKGROUND OF THE INVENTION

Foamed polyethylene compositions can be low density polyethylene ("LDPE") compositions having a broad molecular weight distribution and containing high numbers of long chain branches. Long chain branching permits lower extrusion temperature and provides higher elongation viscosity (strain hardening) in the crystallization temperature range to form a fine foam bubble. Foamed polyethylene resins can lower the weight of a multilayer film by twenty percent (20%) to sixty percent (60%) when compared with a conventional solid film of the same thickness. However, LDPE foam films lack the toughness required for many end use applications, particularly in the areas of tear resistance and puncture resistance Bending stiffness is an important film property, but often comes at the cost of increased raw material weight with current downgauging solutions. A foamed core layer, along with 5-layer Polyolefin Dedicated ("POD") technology, can allow for better bending stiffness without sacrificing low weight. However, multilayer foam films are typically prepared by physical foaming techniques which typically require significant capital investment in the form of expensive extruder retrofitting. A need exists, therefore, for polyethylene compositions which can provide the bending stiffness, toughness, tear resistance, and puncture resistance required in the many end-use applications of blown foam films without significant capital investment.

SUMMARY OF THE INVENTION

Provided herein are multilayer foam films. The multilayer foam film comprises a core layer and two skin layers. The core layer is sandwiched between the skin layers. Each of the skin layers comprise ethylene 1-hexene copolymer and an additive. The core layer comprises a LDPE composition, a blend partner and foaming agent. In an aspect, the core layer comprises the LDPE composition in an amount of between about 40 and about 50 percent by weight. In an aspect, the LDPE composition has a density of about 0.922 g/cm$^3$ and a melt index ("MI") of about 0.33 g/10 min. In an aspect, the core layer comprises a foaming agent in an amount of about 3 percent by weight.

For example, the multilayer foam film may comprise a core layer and two skin layers, (i) the core layer comprising the product of the combination of an LDPE composition, at least one blend partner and at least one foaming agent; and (ii) the two skin layers each independently comprising the product of the combination of an ethylene 1-hexene copolymer and at least one additive; wherein the core layer is disposed between the two skin layers.

In another aspect, the blend partner can be a polyethylene composition having a density between about 0.910 and about 0.940 g/cm$^3$ and an MI between about 0.20 and about 0.50 g/10 min. In an aspect, the blend partner is a metallocene polyethylene composition having a density of about 0.920 g/cm$^3$ and an MI of about 0.5 g/10 min. In an aspect, the blend partner is a metallocene polyethylene composition having a density of about 0.940 g/cm$^3$ and an MI of about 0.25 g/10 min. In an aspect, the blend partner is a medium polyethylene composition comprising ethylene 1-hexene copolymer having a density of about 0.935 g/cm$^3$ and an MI of about 0.5 g/10 min. In an aspect, the blend partner is a linear low density polyethylene ("LLDPE") composition having a density of about 0.916 g/cm$^3$ and an MI of about 0.2 g/10 min.

In yet another aspect, the multilayer foam films described herein can comprise two sub-skin layers. In an aspect, the sub-skin layer comprises a high density polyethylene composition. In an aspect, the high density polyethylene composition has a density of about 0.961 g/cm$^3$ and an MI of about 0.7 g/10 min.

As described herein, the foam film can have a bending stiffness of about 32 to about 45 mN/mm. The foam film has a machine direction tensile strength of about 25 to about 35 N. The foam film can have a transverse direction tensile strength of about 15 to about 30 N. The foam film can have a 1% secant modulus of about 9 to about 14 N. The foam film can have an Elmendorf Tear in the machine direction of about 115 to about 350 grams-force. The foam film can have an Elmendorf Tear in the transverse direction of about 600 to about 1400 grams-force. The foam film can have a puncture resistance of about 15 to about 60 N. The foam film has a dart drop of about 20 to about 80 grams. In an aspect, the core layer can have a light transmission percent of about 75 percent or greater.

Also, provided herein are methods of making a multilayer foam film comprising the steps of preparing a foamed core layer comprising a LDPE composition, blend partner and a foaming agent, and processing the foamed core layer between two skin layers. The blend partner can be a polyethylene composition having a density between about 0.910 and about 0.940 g/cm$^3$ and an MI between about 0.20 and about 0.50 g/10 min. Further, in an aspect, each skin layer comprises an ethylene 1-hexene copolymer and an additive. In an aspect, the method further comprises the step of sandwiching a sub skin layer between the core layer and each of the skin layers.

As described herein, the additive of the multilayer foam film can be an activator or nucleator. The foaming agent of the multilayer foam file can be a chemical blowing agent or a physical foaming agent.

DESCRIPTION OF THE PREFERRED EMBODIMENTS

Figure 1A:
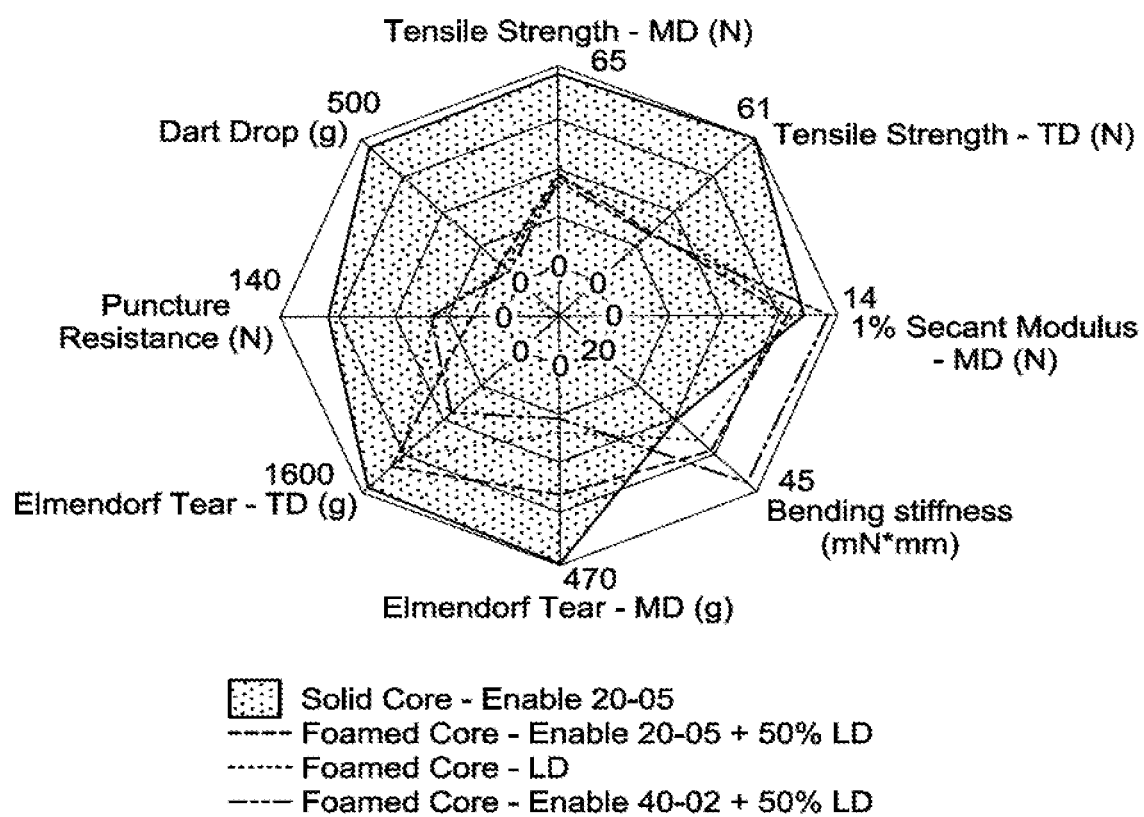
FIG. 1A depicts the tensile strength, secant modulus, bending stiffness, Elmendorf tear, puncture resistance and dart drop for Formulations 1 through 4 of Example I.

As described herein, chemical foaming agents ("CFAs") are added into extruder together with a polyethylene composition and blend partner as masterbatch to a blown film extrusion process. The foaming agent decomposes during processing and resulting gas dissolves into the melt (also referred to herein as a "polymer melt" or "polyethylene composition melt"). Upon leaving a die, gas expands and creates foamed film.

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

The term "alpha-olefin" refers to an olefin having a terminal carbon-to-carbon double bond in the structure thereof $(R^1R^2)$—C=$CH_2$, where $R^1$ and $R^2$ can be independently hydrogen or any hydrocarbyl group. In an aspect, $R^1$ is hydrogen, and $R^2$ is an alkyl group. A "linear alpha-olefin" is an alpha-olefin as defined in this paragraph wherein R' is hydrogen, and $R^2$ is hydrogen or a linear alkyl group.

A "catalyst system" as used herein may include one or more polymerization catalysts, activators, supports/carriers, or any combination thereof.

The terms "catalyst system" and "catalyst" are used interchangeably herein.

The term "composition distribution breadth index" ("CDBI") refers to the weight percent of the copolymer molecules having a comonomer content within 50% of the median total molar comonomer content. The CDBI of any copolymer is determined utilizing known techniques for isolating individual fractions of a sample of the copolymer. Exemplary is Temperature Rising Elution Fraction ("TREF") described in Wild, et al., J. Poly. Sci., Poly. Phys. Ed., Vol. 20, pg. 441 (1982) and U.S. Pat. No. 5,008,204.

As used herein, the term "copolymer" refers to polymers having more than one type of monomer, including interpolymers, terpolymers, or higher order polymers.

The term "$C_n$ group" or "$C_n$ compound" refers to a group or a compound with total number carbon atoms "n." Thus, a $C_m$-$C_r$, group or compound refers to a group or a compound having total number of carbon atoms in a range from m to n. For example, a $C_1$-$C_{50}$ alkyl group refers to an alkyl compound having 1 to 50 carbon atoms.

As used herein, the terms "cyclopentadiene" and "cyclopentadienyl" are abbreviated as "C" p.

All numerical values within the detailed description and the claims herein are modified by "about" or "approximately" the indicated value, taking into account experimental error and variations.

The term "density", unless otherwise specified, refers to the density of the polyethylene composition independent of any additives, such as antiblocks, which may change the tested value.

As used herein, in reference to Periodic Table Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, the term "linear low density polyethylene" ("LLDPE") means polyethylene copolymers having a significant number of short branches. LLDPEs can be distinguished structurally from conventional LDPEs because LLDPEs typically have minimal long chain branching and more short chain branching than LDPEs.

The term "metallocene catalyzed linear low density polyethylene" ("mLLDPE") refers to an LLDPE composition produced with a metallocene catalyst.

The term "linear medium density polyethylene" ("MDPE") refers to a polyethylene copolymer having a density from about 0.930 g/cm$^3$ to about 0.950 g/cm$^3$.

As used herein, the term "metallocene catalyst" refers to a catalyst having at least one transition metal compound containing one or more substituted or unsubstituted Cp moiety (typically two Cp moieties) in combination with a Group 4, 5, or 6 transition metal. A metallocene catalyst is considered a single site catalyst. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "melt index" ("MI") is the number of grams extruded in 10 minutes under the action of a standard load and is an inverse measure of viscosity. A high MI implies low viscosity and a low MI implies high viscosity. In addition, polymers are shear thinning, which means that their resistance to flow decreases as the shear rate increases. This is due to molecular alignments in the direction of flow and disentanglements.

As provided herein, MI is determined according to ASTM D-1238-E (190° C./2.16 kg), also sometimes referred to as $I_2$ or $I_{2.16}$.

The "melt index ratio" ("MIR") provides an indication of the amount of shear thinning behavior of the polymer and is a parameter that can be correlated to the overall polymer mixture molecular weight distribution data obtained separately by using Gas Permeation Chromatography ("GPC") and possibly in combination with another polymer analysis including TREF. MIR is the ratio of 121/12.

The term "melt strength" is a measure of the extensional viscosity and is representative of the maximum tension that can be applied to the melt without breaking. Extensional viscosity is the polyethylene composition's ability to resist thinning at high draw rates and high draw ratios. In melt processing of polyolefins, the melt strength is defined by two key characteristics that can be quantified in process-related terms and in rheological terms. In extrusion blow molding and melt phase thermoforming, a branched polyolefin of the appropriate molecular weight can support the weight of the fully melted sheet or extruded portion prior to the forming stage. This behavior is sometimes referred to as sag resistance.

As used herein, "$M_n$" is number average molecular weight, "$M_w$" is weight average molecular weight, and "$M_z$" is z-average molecular weight. Unless otherwise noted, all molecular weight units (e.g., $M_w$, $M_n$, $M_z$) including molecular weight data are in the unit of $g \cdot mol^{-1}$.

As used herein, unless specified otherwise, percent by mole is expressed as "mole %," and percent by weight is expressed as "wt %."

Molecular weight distribution ("MWD") is equivalent to the expression $M_w/M_n$ and is also referred to as polydispersity index ("PDI"). The expression $M_w/M_n$ is the ratio of $M_w$ to $M_n$. $M_w$ is given by $$M_w = \frac{\sum_i n_i M_i^2}{\sum_i n_i M_i},$$

$M_n$ is given by $$M_n = \frac{\sum_i n_i M_i^2}{\sum_i n_i},$$

$M_z$ is given by $$M_z = \frac{\sum_i n_i M_i^3}{\sum_i n_i M_i^2},$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001). The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are about 1.463 g/ml at about 21° C. and about 1.284 g/ml at about 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the refractive index increment for the system. The refractive index, n=1.500 for TCB at 145° C. Units on parameters throughout this description of the GPC-3D method are such that concentration is expressed in $g/cm^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and λ=657 nm. A high temperature Viscotek Corporation viscometer, which has four capillaries arranged in a Wheatstone bridge configuration with two pressure transducers, can be used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the GPC-DRI-LS-VIS method as follows. The average intrinsic viscosity, $[\eta]_{avg}$ of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'_{vis} = \frac{[\eta]_{avg}}{k M_v^\alpha}.$$

$M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, $Mi^2$. All molecular weights are weight average unless otherwise noted. All molecular weights are reported in g/mol unless otherwise noted. This method is the preferred method of measurement and used in the examples and throughout the disclosures unless otherwise specified. See also, for background, Macromolecules, Vol. 34, No. 19, Effect of Short Chain Branching on the Coil Dimensions of Polyolefins in Dilute Solution, Sun et al., pg. 6812-6820 (2001).

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term olefin includes all structural isomeric forms of olefins, unless it is specified to mean a single isomer or the context clearly indicates otherwise.

As used herein, the term "polymer" refers to a compound having two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used herein, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer. A copolymer can be terpolymers and the like.

As used herein, the terms "polymerization temperature" and "reactor temperature" are interchangeable.

As used herein, the term "shear thinning ratio" refers to the complex viscosity at 190° C. at 0.01 rad/s over the complex viscosity at 190° C. at 100 rad/s (or the nearest measured point).

The term "substantially uniform comonomer distribution" is used herein to mean that comonomer content of the polymer fractions across the molecular weight range of the ethylene-based polymer vary by <10.0 wt %. In an aspect, a substantially uniform comonomer distribution refers to <8.0 wt %, <5.0 wt %, or <2.0 wt %.

As used herein, the term "supported" refers to one or more compounds that are deposited on, contacted with, vaporized with, bonded to, incorporated within, adsorbed or absorbed in, or on, a support or carrier. The terms "support" and "carrier" can be used interchangeably and include any support material including, but not limited to, a porous support material or inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

In an extrusion process, "viscosity" is a measure of resistance to shearing flow. Shearing is the motion of a fluid, layer-by-layer, like a deck of cards. When polymers flow through straight tubes or channels, the polymers are sheared and resistance is expressed in terms of viscosity.

"Extensional" or "elongational viscosity" is the resistance to stretching. In fiber spinning, film blowing and other processes where molten polymers are stretched, the elongational viscosity plays a role. For example, for certain liquids, the resistance to stretching can be three times larger than in shearing. For some polymeric liquids, the elongational viscosity can increase (tension stiffening) with the rate, although the shear viscosity decreased.

As used herein, the "bending stiffness" is a measure of the resistance of film deformation when bent, and can be calculated the by following equation:

$$S_b = \frac{M}{b(1/R)},$$

where $S_b$ is the bending stiffness, measured in mN*mm, M is the moment width, b is the width, and R is the radius of the curvature. Bending stiffness can be measured by applying opposing forces at various points on a beam and measuring the resulting curvature of the beam. For example, in the 3-point method, force is applied in one direction on the ends and in the opposite direction in the center, and the resulting radius of the curvature is measured.

Various measurements described herein are based on certain test standards. For example, measurements of tensile strength in the machine direction (MD) and transverse direction (TD) are based on ASTM D882. Measurements of Elmendorf tear strength in the machine direction (MD) and transverse direction (TD) are based on ASTM D1922-09. Measurements for 1% Secant Modulus are based on ASTM D790A. Measurements for puncture resistance are based on ASTM D5748, which is designed to provide load versus deformation response under biaxial deformation conditions at a constant relatively low test speed (change from 250 mm/min to 5 mm/min after reach pre-load (0.1 N)). Measurements of dart-drop are made using ISO 7765-1, method "A". Light transmission percent (or haze) measurements are based on ASTM D1003 using a haze meter Haze-Guard Plus AT-4725 from BYK Gardner and defined as the percentage of transmitted light passing through the bulk of the film sample that is deflected by more than 2.5

The present multilayer foam film comprises a core layer and two skin layers that inserted between or sandwiching the core layer. The core layer comprises a polyethylene composition, a blend partner and a foaming agent. The polyethylene composition of the core layer is an LDPE composition.

As described herein, the present polyethylene compositions comprise from about 50.0 mol % to about 100.0 mol % of units derived from ethylene. The lower limit on the range of ethylene content can be from 50.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The polyethylene composition can have an upper limit on the range of ethylene content of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on polymer units derived from ethylene.

Further provided herein are polyethylene compositions produced by polymerization of ethylene and, optionally, an alpha-olefin comonomer having from 3 to 10 carbon atoms. Alpha-olefin comonomers are selected from monomers having 3 to 10 carbon atoms, such as $C_3$-$C_{10}$ alpha-olefins or $C_4$-$C_8$ alpha-olefins. Alpha-olefin comonomers can be linear or branched or may include two unsaturated carbon-carbon bonds, i.e., dienes. Examples of suitable comonomers include linear $C_3$-$C_{10}$ alpha-olefins and alpha-olefins having one or more $C_1$-$C_3$ alkyl branches or an aryl group. Comonomer examples include propylene, 1-butene, 3-methyl-1-butene, 3,3-dimethyl-1-butene, 1-pentene, 1-pentene with one or more methyl, ethyl, or propyl substituents, 1-hexene, 1-hexene with one or more methyl, ethyl, or propyl substituents, 1-heptene, 1-heptene with one or more methyl, ethyl, or propyl substituents, 1-octene, 1-octene with one or more methyl, ethyl, or propyl substituents, 1-nonene, 1-nonene with one or more methyl, ethyl, or propyl substituents, ethyl, methyl, or dimethyl-substituted 1-decene, 1-dodecene, and styrene.

Exemplary combinations of ethylene and comonomers include: ethylene 1-butene, ethylene 1-pentene, ethylene 4-methyl-1-pentene, ethylene 1-hexene, ethylene 1-octene, ethylene decene, ethylene dodecene, ethylene 1-butene 1-hexene, ethylene 1-butene 1-pentene, ethylene 1-butene 4-methyl-1-pentene, ethylene 1-butene 1-octene, ethylene 1-hexene 1-pentene, ethylene 1-hexene 4-methyl-1-pentene, ethylene 1-hexene 1-octene, ethylene 1-hexene decene, ethylene 1-hexene dodecene, ethylene propylene 1-octene, ethylene 1-octene 1-butene, ethylene 1-octene 1-pentene, ethylene 1-octene 4-methyl-1-pentene, ethylene 1-octene 1-hexene, ethylene 1-octene decene, ethylene 1-octene dodecene, and combinations thereof. It should be appreciated that the foregoing list of comonomers and comonomer combinations are merely exemplary and are not intended to be limiting. Often, the comonomer is 1-butene, 1-hexene, or 1-octene During copolymerization, monomer feeds are regulated to provide a ratio of ethylene to comonomer, e.g., alpha-olefin, so as to yield a polyethylene having a comonomer content, as a bulk measurement, of from about 0.1 mol % to about 20 mol % comonomer. In other aspects the comonomer content is from about 0.1 mol % to about 4.0 mol %, or from about 0.1 mol % to about 3.0 mol %, or from about 0.1 mol % to about 2.0 mol %, or from about 0.5 mol % to about 5.0 mol %, or from about 1.0 mol % to about 5.0 mol %. The reaction temperature, monomer residence time, catalyst system component quantities, and molecular weight control agent (such as $H_2$) may be regulated so as to provide desired LLDPE compositions. For linear polyethylenes, the amount of comonomers, comonomer distribution along the polymer backbone, and comonomer branch length will generally delineate the density range.

Comonomer content is based on the total content of all monomers in the polymer. The polyethylene copolymer has minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis} \geq 0.980$, 0.985, $\geq 0.99$, $\geq 0.995$, or 1.0. While such values are indicative of little to no long chain branching, some long chain branches can be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

In an aspect, the present polyethylene compositions comprise ethylene-based polymers which include LLDPE produced by gas-phase polymerization of ethylene and, optionally, an alpha-olefin with a catalyst having as a transition metal component a bis(n-$C_{3-4}$ alkyl cyclopentadienyl) hafnium compound, wherein the transition metal component comprises from about 95 to about 99 mol % of the hafnium compound.

Generally, LLDPEs can be polymerized in any catalytic polymerization process, including solution phase processes, gas phase processes, slurry phase processes, and combinations of such processes known to those skilled in the art. An exemplary process used to polymerize ethylene-based polymers, such as LLDPEs, is as described in U.S. Pat. Nos. 6,936,675 and 6,528,597, which are each incorporated herein by reference. To produce the present polyethylene compositions, however, a single site metallocene catalyst Hf-P catalyst in a single gas phase process is preferred.

The above-described processes can be tailored to achieve desired LLDPE compositions. For example, comonomer to ethylene concentration or flow rate ratios are commonly used to control composition density. Similarly, hydrogen to ethylene concentrations or flow rate ratios are commonly used to control composition molecular weight.

Polyethylene compositions provided herein can be blends of LLDPE and other polymers, such as additional polymers prepared from ethylene monomers. Exemplary additional polymers are LLDPE, non-linear LDPE, very low density polyethylene ("VLDPE"), MDPE, high density polyethylene ("HDPE"), differentiated polyethylene ("DPE"), and combinations thereof. DPE copolymers include ethylene-vinyl acetate ("EVA"), ethylene-methyl acrylate ("EMA"), ethylene-ethyl acrylate ("EEA"), ethylene-butyl acrylate ("EBA"), and other specialty copolymers. The additional polymers contemplated in certain aspects include ethylene homopolymers and/or ethylene-olefin copolymers.

Polyethylene compositions composed of blended polymers include at least 0.1 wt % and up to 99.9 wt % of the LLDPE, and at least 0.1 wt % and up to 99.9 wt % of one or more additional polymers, with these wt % based on the total weight of the polyethylene composition. Alternative lower limits of the LLDPE can be 5%, 10%, 20%, 30%, 40%, or 50% by weight. Alternative upper limits of the LLDPE can be 95%, 90%, 80%, 70%, 60%, and 50% by weight. Ranges from any lower limit to any upper limit are within the scope of the invention. Preferred blends include more than about 90% LLDPE, and preferably more than about 95% LLDPE. In an aspect, the blends include from 5-85%, alternatively from 10-50% or from 10-30% by weight of the LLDPE. The balance of the weight percentage is the weight of the additional and/or other type of polymers, e.g., different LLDPE, LDPE, VLDPE, MDPE, HDPE, DPE such as EVA, EEA, EMA, EBA, and combinations thereof.

The polyethylene compositions can have a density greater than or equal to ("≥") about 0.930 g/cm$^3$, ≥about 0.935 g/cm$^3$, ≥about 0.940 g/cm$^3$, ≥about 0.945 g/cm$^3$, ≥about 0.950 g/cm$^3$, ≥about 0.955 g/cm$^3$, and ≥about 0.960 g/cm$^3$. Alternatively, polyethylene compositions can have a density less than or equal to ("≤") about 0.960 g/cm$^3$ about 0.945 g/cm$^3$, e.g., ≤about 0.940 g/cm$^3$, ≤about 0.937 g/cm$^3$, ≤about 0.935 g/cm$^3$, and ≤about 0.930 g/cm$^3$. These ranges include, but are not limited to, ranges formed by combinations any of the above-enumerated values, e.g., from about 0.930 to about 0.945 g/cm$^3$, about 0.930 to about 0.935 g/cm$^3$, about 0.9350 about to 0.940 g/cm$^3$, about 0.935 to about 0.950 g/cm$^3$, etc. Density is determined using chips cut from plaques compression molded in accordance with ASTM D-1928-C, aged in accordance with ASTM D-618 Procedure A, and measured as specified by ASTM D-1505.

The polyethylene compositions have an MI according to ASTM D-1238-E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28 g/10 min, or ≥about 0.30 g/10 min.

Also, the polyethylene compositions can have an MI (I$_{2.16}$)≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. The ranges, however, include, but are not limited to, ranges formed by combinations any of the above-enumerated values, for example: from about 0.1 to about 5.0; about 0.2 to about 2.0; and about 0.2 to about 0.5 g/10 min.

The polyethylene compositions can have a melt index ratio ("MIR") that is a dimensionless number and is the ratio of the high load MI to the MI, or 1216/1216, as described above. The MIR of the polyethylene compositions described herein is from about 25 to about 80, alternatively, from about 25 to about 70, alternatively, from about 30 to about 55, and alternatively, from about 35 to about 50.

The polyethylene compositions can have High Load Melt Index ("HLMI") also referred to herein as I$_{21.6}$ or I$_{21}$ as measured in accordance with ASTM D-1238, condition F (190° C./21.6 kg). Any given polymer composition has an MI and an MIR. As such, the HLMI is fixed and can be calculated if the MI and MIR are known.

In an aspect, polyethylene compositions can have minimal long chain branching (i.e., less than 1.0 long-chain branch/1000 carbon atoms, particularly 0.05 to 0.50 long-chain branch/1000 carbon atoms). Such values are characteristic of a linear structure that is consistent with a branching index of g'$_{vis}$≥0.980, 0.985, ≥0.99, ≥0.995, or 1.0. While such values are indicative of little to no long chain branching, some long chain branches may be present (i.e., less than 1.0 long-chain branch/1000 carbon atoms, or less than 0.5 long-chain branch/1000 carbon atoms, particularly 0.05 to 0.50 long-chain branch/1000 carbon atoms).

The polyethylene compositions can have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. Both a substantially uniform and an orthogonal comonomer distribution may be determined using fractionation techniques such as gel permeation chromatography-differential viscometry ("GPC-DV"), temperature rising elution fraction-differential viscometry ("TREF-DV") or cross-fractionation techniques.

Certain of the present polyethylene compositions are sold under the ENABLE® trademark, including metallocene polyethylene compositions ("ENABLE® mPE"), which are available from ExxonMobil Chemical Company. ENABLE® mPE polyethylene compositions balance processability and mechanical properties, including tensile strength and elongation to break with advanced drawdown and enhanced pipe rupture (failure) time and toughness. Applications for ENABLE products include food packaging, form fill and seal packaging, heavy duty bags, lamination film, stand up pouches, multilayer packaging film, and shrink film.

For example, ENABLE 3505 HH is a medium density metallocene ethylene-hexene copolymer having a processing aid additive, a thermal stabilizer additive, a density of about 0.935 g/cm$^3$, and an MI (190° C., 2.16 kg) of about 0.5 g/10 min.

Likewise, ENABLE MC is yet another medium density metallocene ethylene-hexene copolymer having a processing aid additive, a thermal stabilizer, a density of about 0.935 g/cm$^3$, and an MI (190° C., 2.16 kg) of about 0.5 g/10 min.

Also, certain of the polyethylene compositions are currently sold as Exceed XP™ metallocene polyethylene ("mPE") are commercially available from ExxonMobil Chemical Company, Houston, Tex. Exceed XP™ mPE can provide step-out performance with respect to, for example, dart drop impact strength, flex-crack resistance, and machine direction ("MD") tear, as well as maintaining stiffness at lower densities. Exceed XP™ mPE can provide optimized solutions for a good balance of melt strength, toughness, stiffness, and sealing capabilities which makes this family of polymers well-suited for blown film/sheet solutions.

The present polyethylene compositions typically have a broad composition distribution as measured by Composition Distribution Breadth Index ("CDBI") or solubility distribution breadth index ("SDBI"). For details of determining the CDBI or SDBI of a copolymer, see, for example, PCT Publication No. WO 93/03093, published Feb. 18, 1993. Polymers produced using a catalyst system described herein have a CDBI less than 50%, or less than 40%, or less than 30%. In an aspect, the polymers have a CDBI of from 20% to less than 50%. In an aspect, the polymers have a CDBI of from 20% to 35%. In an aspect, the polymers have a CDBI of from 25% to 28%.

The melt strength of the polyethylene compositions may be in the range from about 1 to about 100 cN, about 1 to about 50 cN, about 1 to about 25 cN, about 3 to about 15 cN, about 4 to about 12 cN, and about 5 to about 10 cN. The melt strength of the polyethylene compositions at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec$^2$. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

Catalysts—Conventional

Conventional catalysts refer to Ziegler Natta catalysts or Phillips-type chromium catalysts. Examples of conventional-type transition metal catalysts are discussed in U.S. Pat. Nos. 4,115,639, 4,077,904 4,482,687, 4,564,605, 4,721, 763, 4,879,359 and 4,960,741. The conventional catalyst compounds that may be used in the processes disclosed herein include transition metal compounds from Groups 3 to 10, preferably 4 to 6 of the Periodic Table of Elements.

These conventional-type transition metal catalysts may be represented by the formula:

$$MR_x,$$

where M is a metal from Groups 3 to 10, or Group 4, or titanium; R is a halogen or a hydrocarbyloxy group; and x is the valence of the metal M, preferably x is 1, 2, 3 or 4, or x is 4. Non-limiting examples of R include alkoxy, phenoxy, bromide, chloride and fluoride. Non-limiting examples of conventional-type transition metal catalysts where M is titanium include TiCl3, TiCl4, TiBr4, Ti(OC2H5)3Cl, Ti(OC2H5)Cl3, Ti(OC4H9)3Cl, Ti(OC3H7)2Cl2, Ti(OC2H5)2Br2, TiCl3.1/3AlCl3 and Ti(OC12H25)Cl3. Conventional chrome catalysts, often referred to as Phillips-type catalysts, may include CrO3, chromocene, silyl chromate, chromyl chloride (CrO2Cl2), chromium-2-ethylhexanoate, chromium acetylacetonate (Cr(AcAc)3). Non-limiting examples are disclosed in U.S. Pat. Nos. 2,285,721, 3,242,099 and 3,231,550. For optimization, many conventional-type catalysts require at least one cocatalyst. A detailed discussion of cocatalysts may be found in U.S. Pat. No. 7,858,719, Col. 6, line 46, to Col. 7, line 45.

Catalysts—Metallocene

Metallocene catalysts (also referred to herein sometimes as metallocenes or metallocene compounds) are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligand(s) and the ring(s) or ring system(s) can comprise one or more atoms selected from Groups 13 to 16 atoms of the Periodic Table of Elements. In an aspect, the atoms are selected from the group consisting of carbon, nitrogen, oxygen, silicon, sulfur, phosphorous, germanium, boron and aluminum or a combination thereof. Further, in an aspect, the ring(s) or ring system(s) comprise carbon atoms including, but not limited to, Cp ligands or Cp-type ligand structures or other similarly functioning ligand structures such as pentadiene, cyclooctatetraendiyl, or imide ligands. In an aspect, the metal atom is selected from Groups 3 through 15 and the lanthanide or actinide series of the Periodic Table of Elements. In an aspect, the metal is a transition metal from Groups 4 through 12. In an aspect, the metal is a transition metal from Groups 4, 5 or 6. In an aspect, the metal is a transition metal from Group 4.

Exemplary metallocene catalysts and catalyst systems are described in, for example, U.S. Pat. Nos. 4,530,914, 4,871, 705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664; EP-A-0 591 756, EP-A-0 520-732, EP-A-0 420 436, EP-B1 0 485 822, EP-B 1 0 485 823, EP-A2-0 743 324, EP-B 1 0 518 092; WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144.

Polymerization Processes

The catalysts described above are suitable for use in any olefin pre-polymerization or polymerization process or both. Suitable polymerization processes include solution, gas phase, slurry phase, and a high-pressure process, or any combination thereof. A desirable process is a gas phase polymerization of one or more olefin monomers having from 2 to 30 carbon atoms, from 2 to 12 carbon atoms in an aspect, and from 2 to 8 carbon atoms in an aspect. Other monomers useful in the process include ethylenically unsaturated monomers, diolefins having 4 to 18 carbon atoms, conjugated or nonconjugated dienes, polyenes, vinyl monomers and cyclic olefins. Non-limiting monomers may also include norbornene, norbornadiene, isobutylene, isoprene, vinylbenzocyclobutane, styrenes, alkyl substituted styrene, ethylidene norbornene, dicyclopentadiene and cyclopentene.

Hydrogen gas is often used in olefin polymerization to control the final properties of the polyolefin. See, Polypropylene Handbook 76-78 (Hanser Publishers, 1996). Increasing concentrations (partial pressures) of hydrogen increase the melt flow rate ("MFR") and/or MI of the polyolefin generated. The MFR or MI can thus be influenced by the hydrogen concentration. The amount of hydrogen in the polymerization can be expressed as a mole ratio relative to the total polymerizable monomer (ethylene, for example) or to the blend of ethylene and hexane or propene. The amount of hydrogen used in the polymerization process is an amount necessary to achieve the desired MFR or MI of the final polyolefin resin. The mole ratio of hydrogen to total monomer ($H_2$:monomer) is in a range of from greater than 0.0001 in an aspect, from greater than 0.0005 in an aspect, from greater than 0.001 in an aspect, less than 10 in an aspect, less than 5 in an aspect, less than 3 in an aspect, and less than 0.10 in an aspect, wherein a desirable range may comprise any combination of any upper mole ratio limit with any lower mole ratio limit described herein. Expressed another way, the amount of hydrogen in the reactor at any time may range to up to 5000 ppm, up to 4000 ppm in an aspect, up to 3000 ppm in an aspect, between 50 ppm and 5000 ppm in an aspect, and between 100 ppm and 2000 ppm in an aspect.

In a gas phase polymerization process, a continuous cycle is often employed where one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

More specifically, materials and processes for making EXCEED™ and ENABLE™ polyethylene compositions have been described in U.S. Pat. No. 6,956,088, Example 1. Other publications describing the materials and processes include U.S. Publication No. 2009/0297810, Example 1; U.S. Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

An exemplary polymer composition comprises ethylene copolymer having at least 50 wt. % ethylene-derived units and up to 50 wt. %, preferably 1 wt. % to 35 wt. %, even more preferably 1 wt. % to 6 wt. % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.930 g/cm³, preferably 0.915 to 0.923 g/cm³), a CDBI of 60% to 80%, preferably between 65% and 80%, and a melt index, $I_{2.16}$ of about 0.5 to 5.0 g/10 min. These polymers are metallocene polyethylenes (mPEs). Such ethylene copolymers are available from ExxonMobil Chemical Company under the tradename Exceed™ mPEs.

Another exemplary polymer is an ethylene copolymer comprising units derived from ethylene and at least one alpha olefin having at least 5 carbon atoms, having a melt index of from 0.1 to 15; a CDBI of at least 70%, and a density of 0.910 to 0.950 g/cm³ (preferably 0.915 to 0.940 g/cm³, preferably 0.918 to 0.923 g/cm³), a melt index of about 0.1 to 3.0 g/min. Some such ethylene copolymers have a $0.87 \leq g'_{vis} \leq 0.97$. Some such mPEs are available from ExxonMobil Chemical Company under the tradename Enable™ mPE resins.

In some embodiments, a polyethylene is made according to U.S. Pat. No. 6,956,088 using the bis(n-propylcyclopentadienyl)HfCl₂/MAO catalyst system under polymerization conditions to produce an ethylene-hexene polymer having a density of 0.9459 g/cm³, a melt index ($I_{2.16}$) of nominally 4.1 g/10 min., and a melt index ratio ($I_{21.6}/I_{2.16}$) of about 16.8. In some embodiments, such polyethylene polymers have a comonomer content of about 0.8 wt. %, a Mn of 32,162 g/mol, a $M_w$ of 84,160 g/mol, a Mz of 166,160 g/mol, $M_w/M_n$ (MWD) of 2.62, and an $M_z/M_w$ of 1.97. In some embodiments, such polyethylene polymers have a DSC $2^{nd}$ melting temperature of 129.1° C., crystallization peaks at temperatures of 115.5° C. (main) and 80.3° C. (minor), and a heat of fusion, $\Delta H_f$, of 181.46 J/g.

In some embodiments, a polyethylene is made according to U.S. Pat. No. 6,956,088 using the bis(n-propylcyclopentadienyl)HfCl₂/MAO catalyst system under polymerization conditions to produce an ethylene-hexene polymer having a density of 0.9208 g/cm³, a melt index ($I_{2.16}$) of nominally 0.75 g/10 min., and a melt index ratio (I21.6/I2.16) of about 32.3.

In some embodiments, a polyethylene is made according to U.S. Pat. No. 6,956,088 using the bis(n-propylcyclopentadienyl)HfCl₂/MAO catalyst system under polymerization conditions to produce an ethylene-hexene polymer having a density of 0.9186 g/cm³, a melt index ($I_{2.16}$) of nominally 0.81 g/10 min., and a melt index ratio ($I_{21.6}/I_{2.16}$) of about 22.5.

In some embodiments, a polyethylene is made according to U.S. Pat. No. 6,956,088 using the bis(n-propylcyclopentadienyl)HfCl₂/MAO catalyst system under polymerization conditions to produce an ethylene-based polymer having a density of 0.918 g/cm³, a melt index ($I_{2.16}$) of 0.80 g/10 min., and a melt index ratio ($I_{21.6}/I_{2.16}$) of 32. In some embodiments, such polyethylene polymers have a first peak corresponding to a $\log(M_w)$ value of about 4.5 that appears at a TREF elution temperature of 91.0° C. and a second peak at a $\log(M_w)$ value of 5.3 and a TREF elution temperature of 63.0° C.

In some embodiments, a polyethylene is made according to U.S. Pat. No. 6,956,088 using the bis(n-propylcyclopentadienyl)HfCl₂/MAO catalyst system under polymerization conditions to produce an ethylene-based polymer having a density of 0.916 g/cm³ and a melt index ($I_{2.16}$) of 0.70 g/10 min. In some embodiments, such polyethylenes have a first peak corresponding to a $\log(M_w)$ value of about 4.5 that appears at a TREF elution temperature of 91.0° C. and a second peak at a $\log(M_w)$ value of 5.2 and a TREF elution temperature of 63.0° C.

In some embodiments, a polyethylene is made according to U.S. Pat. No. 6,956,088 using the bis(n-propylcyclopentadienyl)HfCl₂/MAO catalyst system under polymerization conditions to produce an ethylene-based polymer having a density of 0.917 g/cm³, a melt index ($I_{2.16}$) of 0.90 g/10 min., a melt index ratio ($I_{21.6}/I_{2.16}$) of 24.4. In some embodiments, such polyethylenes have a first peak corresponding to a $\log(M_w)$ value of about 4.4 that appears at a TREF elution temperature of 91.0° C. and a second peak at a $\log(M_w)$ value of 5.1 and a TREF elution temperature of 62.0° C.

In some embodiments, a suitable polyethylenes have a 75.0 mole % to or 100.0 mole % of units derived from ethylene. The lower limit on the range of ethylene content may be 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole % based on the mole % of polymer units derived from ethylene. In some embodiments, such polyethylenes can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. Such polyethylenes have less than 50.0 mole % of polymer units derived from a $C_3$ to $C_{20}$ olefin, preferably an alpha-olefin, most preferably hexene or octene. The lower limit on the range of $C_3$ to $C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. The upper limit on the range of $C_3$ to $C_{20}$ olefin-content may be 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. In some embodiments, low $C_3$ to $C_{20}$-olefin contents, e.g., 0.0-5.0 mole % are preferred. Comonomer content is based on the total content of all monomers in the polymer.

Typically, such polyethylene polymers have at least a first peak and a second peak in a comonomer distribution analysis, wherein the first peak has a maximum at a $\log(M_w)$ value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a $\log(M_w)$ value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.

In some embodiments, such polyethylene polymers have minimal long-chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index, $g'_{vis} \geq 0.98$. Some suitable polymer compositions have a $g'_{vis} \geq 0.985$, $\geq 0.99$, $\geq 0.995$, or 1.0. While such values are indicative of little to no long-chain branching, some long-chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

Such polyethylene polymers have a CDBI preferably less than 45%, particularly, less than 40.0%, or less than 35.0%. In some embodiments, such polyethylene polymers have a CDBI of from 20.0% to 35.0%. In some embodiments, such polyethylene polymers have a CDBI of from 25.0% to 28.0%. In some embodiments, such polyethylene polymers have an SDBI greater than 15° C., or greater than 16° C., or greater than 17° C., or greater than 18° C., or greater than 19° C., or greater than 20° C. In one embodiment, the polymers have a SDBI of from about 18° C. to about 22° C. In another embodiment, the polymers have a SDBI of from about 18.7° C. to about 21.4° C. In another embodiment, the polymers have a SDBI of from about 20° C. to about 22° C.

In some embodiments, such polyethylene polymers have a density of about 0.912 to about 0.925 g/cm³, from about 0.915 to about 0.921 g/cm³, or about 0.916 to 0.918 g/cm³.

The weight average molecular weight ($M_w$) of such polyethylene polymers may be from about 15,000 to about 250,000 g/mol. Preferably, the weight average molecular weight is from about 20,000 to about 200,000 g/mol, or from about 25,000 to about 150,000 g/mol.

Such polyethylene polymers have a molecular weight distribution ($M_w/M_n$) of from about 1.5 to about 5.0, particularly from about 2.0 to about 4.0, preferably from about 3.0 to about 4.0 or from about 2.5 to about 4.0.

In some embodiments, such polyethylene polymers have a ratio of the z-average molecular weight ($M_z$) to weight average molecular weight ($M_w$) greater than about 1.5 or greater than about 1.7 or greater than about 2.0. In one embodiment, this ratio is from about 1.7 to about 3.5. In yet another embodiment, this ratio is from about 2.0 to about 3.0, or from about 2.2 to about 3.0.

Such polyethylene polymers in certain embodiments have a melt index (MI) or ($I_{2.16}$) as measured by ASTM D-1238-E (190° C./2.16 kg) of about 0.1 to about 300 g/10 min, preferably about 0.1 to about 100 g/10 min, about 0.1 to about 50 g/10 min, about 0.1 g/10 min to about 5.0 g/10 min, about 0.2 to 1.5 g/10 min, about 0.3 to 1.0 g/10 min, 0.5 to 1.0 g/10 min, 0.6 to 1.0 g/10 min, 0.7 to 1.0 g/10 min, or 0.75 to 0.95 g/10 min, particularly about 0.8 g/10 min.

In some embodiments, such polyethylene polymers have a melt index ratio ($I_{21.6}/I_{2.16}$) ($I_{21.6}$ is measured by ASTM D-1238-F, i.e., 190° C./21.6 kg) of from about 10.0 to about 50.0, 15.0 to 45.0, more preferably 20.0 to 40.0, or 22 to about 38.

In some embodiments, such polyethylene polymers exhibit a melting temperature as measured by differential scanning calorimetry ("DSC") of from about 90° C. to about 130° C. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output, $\Delta H_f$, is recorded as the area under the melting peak curve of the sample. The thermal output in joules is a measure of the heat of fusion. The melting temperature, $T_m$, is recorded as the temperature of the greatest heat absorption within the range of melting of the sample. This is called the first melt. $T_{c1}$ is the first non-isothermal crystallization temperature, which is recorded as the temperature of greatest heat generation. The sample is then cooled. The sample is reheated to form a second melt, which is more reproducible than the first melt. The peak melting temperature from the second melt is recorded as the second melting temperature, $T_m$. $T_{c2}$ is second non-isothermal crystallization temperature, and $\Delta H_{c2}$ is the second heat of crystallization. Preferably, ethylene-based polymers of these embodiments exhibit a second melt temperature of from about 100° C. to about 130° C., or about 110° C. to about 130° C., or from about 119° C. to about 123° C. Preferably, ethylene-based polymers of these embodiments exhibit a first melt temperature of from about 95° C. to about 125° C., or from about 100° C. to about 118° C., or from about 107° C. to about 110° C.

In another embodiment, such polyethylene polymers herein contain less than 5.0 ppm hafnium, generally less than 2.0 ppm hafnium, preferably less than 1.5 ppm hafnium, more preferably less than 1.0 ppm hafnium. In an embodiment, the polymer contains in the range of from about 0.01 ppm to about 2 ppm hafnium, preferably in the range of from about 0.01 ppm to about 1.5 ppm hafnium, more preferably in the range of from about 0.01 ppm to 1.0 ppm hafnium. Preferably, the amount of hafnium is greater than the amount of zirconium in the ethylene-based polymer. In other words, in particular embodiments the ratio of hafnium to zirconium (ppm/ppm) is at least 2.0, at least 10.0, at least 15.0, at least 17.0, at least 20.0, or at least about 25.0. While zirconium generally is present as an impurity in hafnium, it will be realized in some embodiments where particularly pure hafnium-containing catalysts are used, the amount of zirconium may be extremely low, resulting in an undetectable amount of zirconium in the ethylene-based polymer. Thus, the upper limit on the ratio of hafnium to zirconium in the polymer can be 50.0, 100.0, 200.0, 500.0 or more.

In some embodiments, such polyethylene polymers have at least a first peak and a second peak in a comonomer distribution analysis, wherein the first peak has a maximum at a log($M_w$) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log ($M_w$) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.; a melt index (190° C./2.16 kg) of from about 0.1 g/10 min to about 5.0 g/10 min; a melt index ratio of from about 15 to about 30; a $M_w$ of from about 20,000 to about 200,000 g/mol; a $M_w/M_n$ of from about 2.0 to about 4.5; and a density of from 0.910 to 0.925 g/cm³. More preferred polymers also have therein an amount of hafnium that is greater than the amount of zirconium, particularly a ratio of hafnium to zirconium (ppm/ppm) is at least 2.0, at least 10.0, at least 15.0, at least 17.0, at least 20.0, or at least about 25.0.

Such polyethylene polymers typically have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt. %. In some embodiments, a substantially uniform comonomer <8.0 wt. %, <5.0 wt. %, or <2.0 wt. %. Both a substantially uniform and an orthogonal comonomer distribution can be determined using fractionation techniques such as gel permeation chromatography-differential viscometry (GPC-DV), temperature rising elution fraction-differential viscometry (TREF-DV) or cross-fractionation techniques.

Polymerization processes for making such polyethylene polymers described herein are disclosed in U.S. Pat. No. 6,956,088 to Farley, including use of a hafnium transition metal metallocene-type catalyst system as described in U.S. Pat. Nos. 6,242,545 and/or 6,248,845, particularly Example 1, hereby incorporated by reference.

Production of Multilayer Foam Film

Blown film extrusion involves the process of extruding the polyethylene composition (also referred to sometimes as a resin) through a die (not shown) followed by a bubble-like expansion. Advantages of manufacturing film in this manner include: (1) a single operation to produce tubing; (2) regulation of film width and thickness by control of the volume of air in the bubble; (3) high extruder output and haul-off speed; (4) elimination of end effects such as edge bead trim and nonuniform temperature that can result from flat die film extrusion; and (5) capability of biaxial orientation (allowing uniformity of mechanical properties).

As part of the process, a melt comprising the LDPE composition and the blend partner are mixed with the foaming agent and extruded through an annular slit die (not shown) to form a thin walled tube. Air is introduced via a hole in the center of the die to blow up the tube like a balloon. Mounted on top of the die, a high-speed air ring (not shown) blows onto the hot film to cool it. The foam film is drawn in an upward direction, continually cooling, until it passes through nip rolls (not shown) where the tube is flattened to create what is known as a 'lay-flat' tube of film. This lay-flat or collapsed tube is then taken back down the extrusion tower (not shown) via more rollers. For high output lines, air inside the bubble may also be exchanged. The lay-flat film is either wound or the edges of the film are slit off to produce two flat film sheets and wound up onto reels to produce a tube of film. For lay-flat film, the tube can be made into bags, for example, by sealing across the width of film and cutting or perforating to make each bag. This operation can be performed either in line with the blown film process or at a later time. The blown film extrusion process is typically a continuous process.

In an aspect, to produce the foam film, the foaming agent is mixed with the polyethylene composition and the blend partner in the extruder. Alternatively, the foaming agent can be mixed with the polyethylene composition and the blend partner prior to entering the extruder. Subsequently the foamed polyethylene composition is extruded at a temperature sufficient to melt the polymers. The foaming agent reacts or decomposes, resulting in a gas being liberated which is dispersed in the melt. Upon exiting the die, gases expand, resulting in foam bubbles in the extruded material. The extruded foam is then blown and drawn off as in a typical blown film extrusion process. Often the multilayer foam films are coextruded, i.e., a plurality of layers are extruded simultaneously through a single die to form the multilayer foam film.

Foaming agents useful in the present polyethylene compositions melts can be any organic or inorganic compound that decomposes at elevated temperatures releasing gases such as air, nitrogen, carbon dioxide, carbon monoxide, or other hydrocarbons. Suitable organic foaming agents that may be utilized include azodicarbonamide and modified azodicarbonamide, i.e., azodicarbonamide modified with zinc oxide, calcium carbonate or the like to lower its decomposition temperature and act as an activator for the foaming agent. Suitable inorganic foaming agents include sodium borohydride, ammonium carbonate, sodium bicarbonate, and modified sodium bicarbonate, i.e., sodium bicarbonate modified with a proton donor such as citric acid. For polyethylene films, the class of foaming agents particularly suited for the process are modified azodicarbonamide and modified sodium bicarbonate.

By way of example, foaming agents can be added to the polyethylene composition and the blend partner at levels of about 0.05 to about 1.00 parts by weight per hundred parts by weight of polymer ("pph"), and beneficially from 0.10 to 0.50 pph, depending on the ultimate density of the multilayer foam film desired.

The decomposition products of the foaming agent that form the gaseous phase or gaseous cells of the foam film include air, nitrogen, carbon dioxide, carbon monoxide and other hydrocarbons. Azodicarbonamides generate primarily nitrogen gas into the melt; modified bicarbonates generate primarily carbon dioxide gas into the melt. Ultimately, these gases expire after extrusion and are replaced by air within the film. Further, these gases have relatively low critical points as well as low solubility in the melt.

Additives, such as activators and nucleators, in combination with the foaming agent, can be present in the polyethylene compositions to ensure the complete decomposition of the foaming agent and to control gaseous cell size. Nucleation agents such as talc and other finely divided fillers may be used to assist in gaseous cell formation by providing sites for the cells to form. The foaming agent, if used in particulate form, can also act as a nucleating agent.

To properly extrude the foamed polyethylene composition described herein, extrusion temperature must be high enough to decompose the foaming agent within the foamed polyethylene composition and thus generate gas pressure. If the melt temperature is too low, only partial decomposition of the foaming agent could result. Undecomposed foaming agent particles may result in agglomerates which can cause voids, irregular cell structures, poor surface appearance, or clog the melt filters or screen packs. More specifically, to prevent premature decomposition, feed zone temperature is typically lower than the decomposition temperature of the chemical foaming agent.

Likewise, pressure exerted on the melt is set so as to retain dissolved gas in the melt until it exits the extrusion die. If pressure is too low, foaming can commence inside the extruder and result in coarse, irregular cell structures with broken and collapsed cells. Coarse foams cause holes in flat films, rough surfaces (shark skin) in profiles, or collapse of blown film tubing.

Vented extruders (not shown) can be used to produce foaming. However, a vent should be plugged or sealed to prevent escape of the foaming agent. In the degassing zone, a higher free volume can result in a slight pressure decrease creating premature foaming in the extruder. To compensate, however, screw speed can be increased, thus increasing pressure on the melt prior to extrusion.

Generally, components (not shown) of an extrusion line (not shown) include an extruder (drive, gearbox and screws), the die, a calibration unit, a cutting device (or saw) and treatment devices for final finishing and handling. Common screws can be used for foam extrusion described herein, provided there is no large pressure decrease in the melting and metering zones of the screw which can lead to unwanted premature foaming in the polyethylene composition melt. The L/D (barrel length/barrel diameter) ratio is typically at least 24:1, and generally screws with an L/D ratio of 30:1 and higher are used. Established screws for processing are three-zone screws (feeding-compression-metering/mixing). Blown foam film extrusion can be performed with a long single-screw extruder, tandem extruders, or a twin-screw extruder.

Polyolefin Dedicated ("POD") 5-layer film extrusion is useful for the co-extrusion of multilayer foam films without barrier materials. The elimination of barrier materials allows for a five-layer POD blown film to achieve reduced thickness while providing good sealing and optical properties.

Interface distortion between the foam and non-foam layers can occur due to elasticity mismatch. This distortion can make production of a uniform thickness for each layer challenging. Thus, the temperature of each layer is typically optimized to match the viscosity of the gas-containing layer with an adjacent non-foaming layer.

Polyethylene foam films have applications in industry packaging (e.g. shrink film, stretch film, bag film or container liners), consumer packaging (e.g. packaging film for frozen products, shrink film for transport packaging, food wrap film, packaging bags, or form, fill and seal packaging film), laminating film (e.g. laminating of aluminum or paper used for packaging such as milk or coffee), barrier film (e.g. film made of raw materials such as polyamides and EVOH acting as an aroma or oxygen barrier used for packaging food, e.g. cold meats and cheese), films for the packaging of medical products, agricultural film (e.g. greenhouse film, crop forcing film, silage film, silage stretch film), insulation, and upholstery material. Ultra-thin crosslinked foam films have applications in electronic organizers, cell phones, and computer monitors.

A key driver in sustainable packaging is to achieve a lower weight. Traditionally, this is done by downgauging. We instead sought to achieve lower weight, without loss of mechanical and other properties, through foamed films as described herein. The present multilayer foam films can be made with lower raw material usage and lower density than typical solid films while maintaining or even increasing film thickness. The multilayer foam films can also provide improved thermal and sound insulation, mechanical damping, lower water vapor permeability, reduced absorption of humidity, enhanced flexibility and conformability, higher or lower tear strength, improved sealing performance, and translucence or opacity.

Film color can affect the quality of polyethylene multilayer foam because color masterbatches contain calcium stearates which can break bubbles and distort the foam.

As described herein, in an aspect, the foaming agent is a chemical blowing agent ("CBA") that can be exothermic or endothermic. Certain chemical blowing agents are nitrogen based and others are bicarbonate based. Compared to physical foaming, chemical foaming typically has lower capital costs but higher operating costs; chemical foaming can typically be performed without significant extruder modifications, but CBAs and CFAs themselves are typically more expensive than physical foaming agents. Physical foaming can be achieved with nitrogen, CO2, isopentane, or fluorocarbons as the foaming agent. Physical forming agents can provide lower densities than chemical blowing agents, which typically reduce density only by about half. In addition, a fine cell structure is achieved by adding nucleating agents such as talc or a specialty Chemical Blowing Agent that acts as a nucleant. Nucleants include Clariant's Hydrocerol CF40T and Reedy's Safoam FPN3049 for PS or FPE50.

As described in the examples below, long chain branched metallocene polyethylene compositions (sold as ENABLE™ grades) were chosen as the blending partner with LDPE in the foamed layer due to their high elongation viscosity. Linear metallocene polyethylene compositions (i.e., EXCEED™ grades) were used in the non-foamed layers to maintain the mechanical strength of the multilayer foam film. Film formulations and processing were designed to optimize key mechanical and stiffness properties according to end-application requirements. Other unique attributes of interest in the market that were achieved in the Examples below include soft touch, thermal isolation, and light diffusion which can bring value in various applications, including hygiene film, collation shrink and agriculture film.

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example I

Four film formulations (Formulations 1 through 4) were investigated and tested in ExxonMobil Technology Center's 5-layer POD blown film line as set out below:

Processing Conditions

| 5 Layer Film | Die Gap: 1.4 mm | Output: 220 kg/hr. | BUR 2.5 |
|---|---|---|---|
| Enable 20-05: | 0.5 MI | 0.920 g/cm$^3$ (density) | |
| Enable 40-02: | 0.25 MI | 0.940 g/cm$^3$ (density) | |

Formulation 1

| Formulation 1: 95 gsm | | | |
|---|---|---|---|
| Skin: | Exceed 1018KB | Enable 20-05HH | additive |
| Sub-skin: | HTA 108 | | |
| Solid Core: | Enable 20-05HH | | |

Formulation 2

| Formulation 2: 95 gsm | | | |
|---|---|---|---|
| Skin: | Exceed 1018KB | Enable 20-05HH | additive |
| Sub-Skin: | HTA 108 | | |
| Foamed Core: | LDPE 165BW1 | 3% foaming agent | |

Formulation 3

| | Formulation 3: 95 gsm | | |
|---|---|---|---|
| Skin: | Exceed 1018KB | Enable 20-05HH | additive |
| Sub-skin: | HTA 108 | | |
| Foamed Core: | Enable 20-05HH | 50% LDPE 165BW1 | 3% foaming agent |

Formulation 4

| | Formulation 4: 95 gsm | | |
|---|---|---|---|
| Skin: | Exceed 1018KB | Enable 20-05HH | additive |
| Sub-skin: | HTA 108 | | |
| Foamed Core: | Enable 40-02HH | 50% LDPE 165BW1 | 3% foaming agent |

Figure 1B:
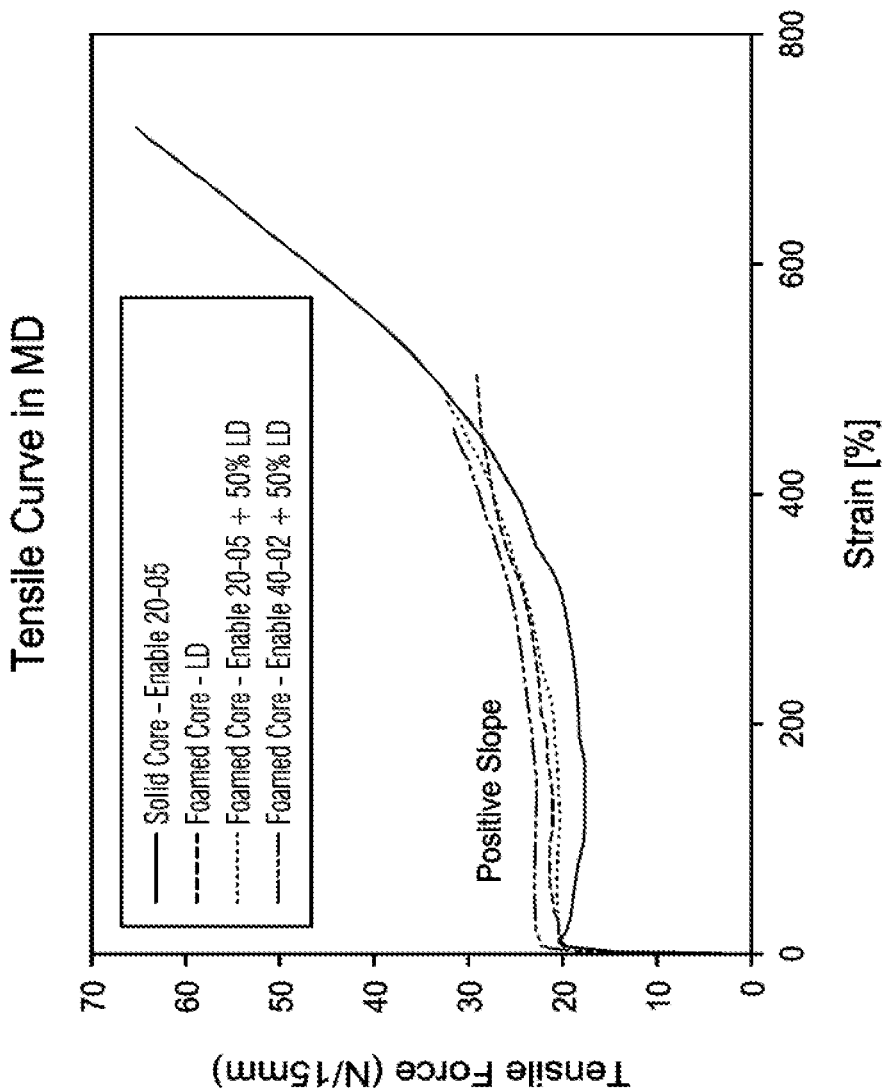
FIG. 1B shows the tensile curves for Formulations 1 through 4 of Example I.
Figure 1C:
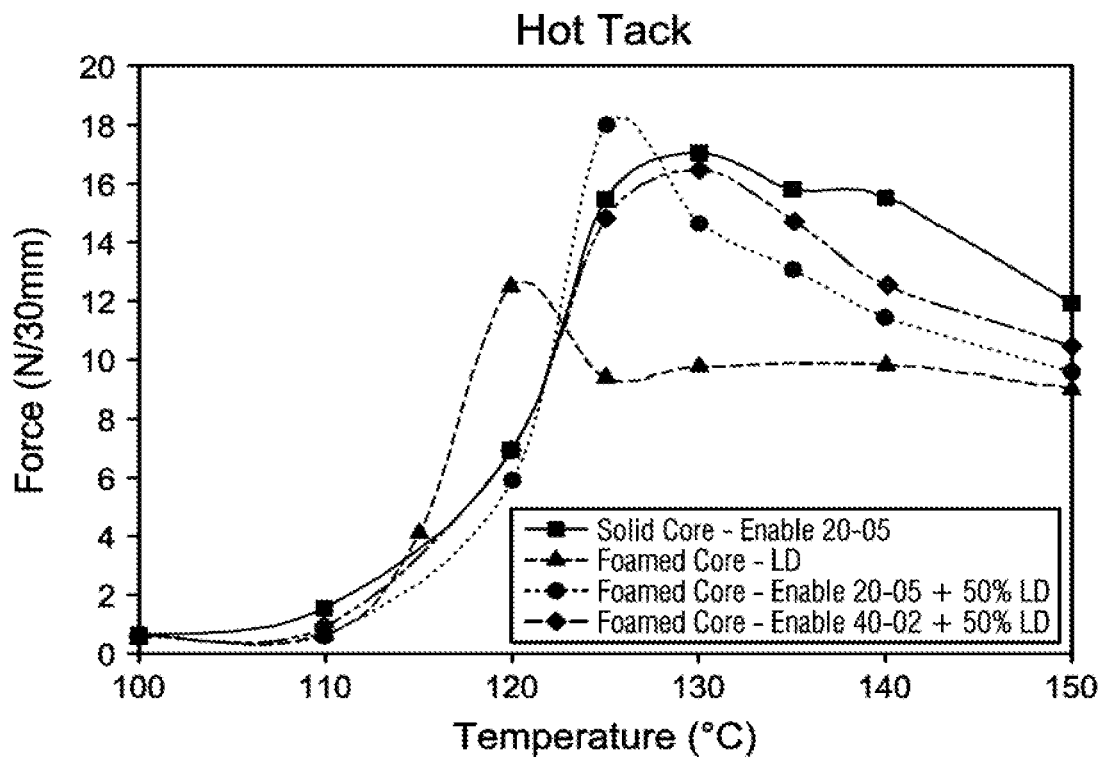
FIG. 1C graphs the hot tack for Formulations 1 through 4 of Example I.
Figure 1D:
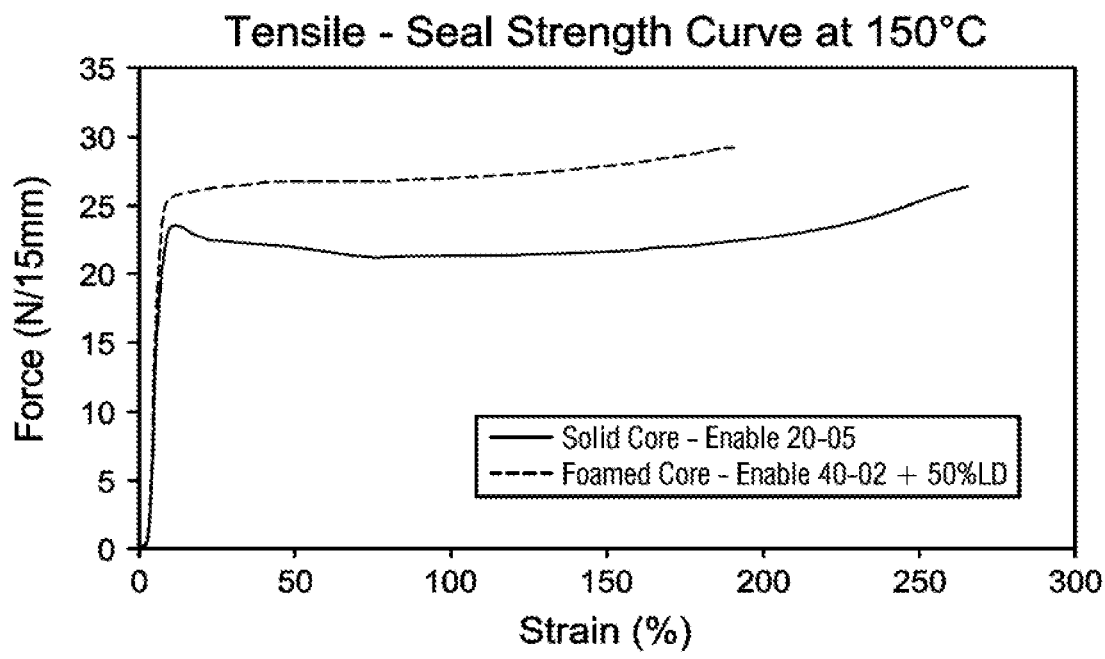
FIG. 1D depicts the tensile-seal strength curves at 150° C. for Formulations 1 and 4 of Example I.

The multiple layer film formulations having a foamed core layer, Formulations 2, 3, and 4, were processed and compared with the solid core film of Formulation 1. As shown in FIG. 1A, bending stiffness improved with foaming, which allows for improved machinability and is desirable in lamination and compression packaging applications. As shown in FIG. 1B, the foamed film formulations were slightly stiffer than the solid core film, as more tensile force was required to reach the same percentage of strain. As shown in FIG. 1C, both foamed blend partners, ENABLE 20-05 (a metallocene ethylene hexene copolymer polyethylene composition having a density of about 0.920 g/cm$^3$ and an MI of about 0.50 g/10 min), and ENABLE 40-02 (a medium density metallocene polyethylene composition having a density of about 0.940 g/cm$^3$ and an MI of about 0.25 g/10 min) were shown to provide an advantage in maintaining hot tack performance versus pure core of the LDPE composition ((LDPE 165BW1) having a density of about 0.922 g/cm$^3$ and an MI of about 0.33 g/10 min). As shown in FIG. 1D, overall, foaming provided up to a 35% increase in bending stiffness to weight ratio with good sealing performance which is useful to enhance on-line machinability.

Example II

Formulations 1, 2, and 3 were investigated in ExxonMobil Technology Center's POD blown film process line as follows:

Process Conditions

| | Die Gap: | Output: | Blow-Up Ratio |
|---|---|---|---|
| 3 layer film | 1.4 mm | 220 kg/hr. | ("BUR"): 3.5 |
| Enable 35-05: | 0.5 MI | 0.935 g/cm$^3$ | |

Formulation 1

| | Formulation 1-70 gsm | |
|---|---|---|
| Skin: | Enable 27-03HH | Additive |
| Solid Core: | Enable 35-05HH | |

Formulation 2

| | Formulation 2-70 gsm | |
|---|---|---|
| Skin: | Enable 27-03HH | Additive |
| Foamed Core: | LDPE 165BW1 | 3% foaming agent |

Formulation 3

| | Formulation 3-70 gsm | | |
|---|---|---|---|
| Skin: | Enable 27-03HH | Additive | |
| Foamed Core: | Enable 35-05HH | 50% LDPE 165BW1 | 3% foaming agent |

Figure 2A:
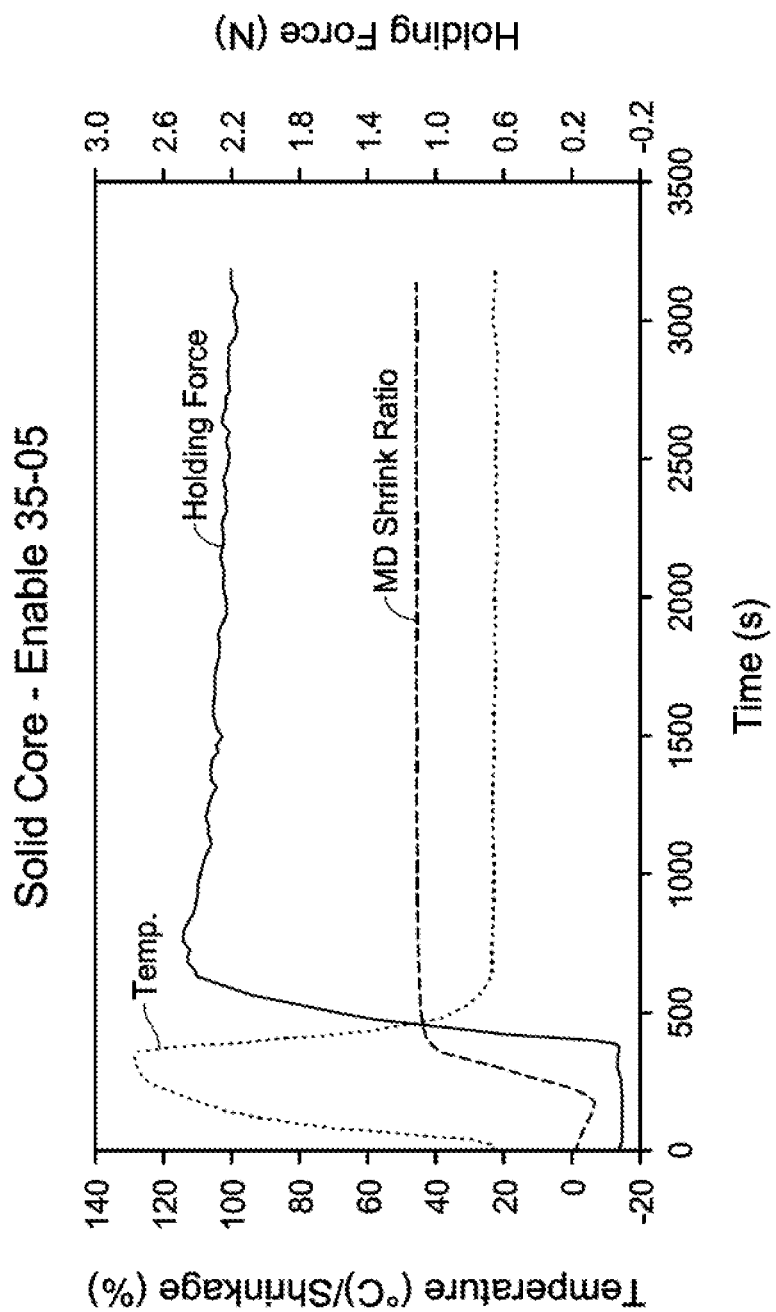
FIG. 2A provides the holding force and MD shrink ratio curves of a solid core layer of Formulation 1 of Example II.
Figure 2B:
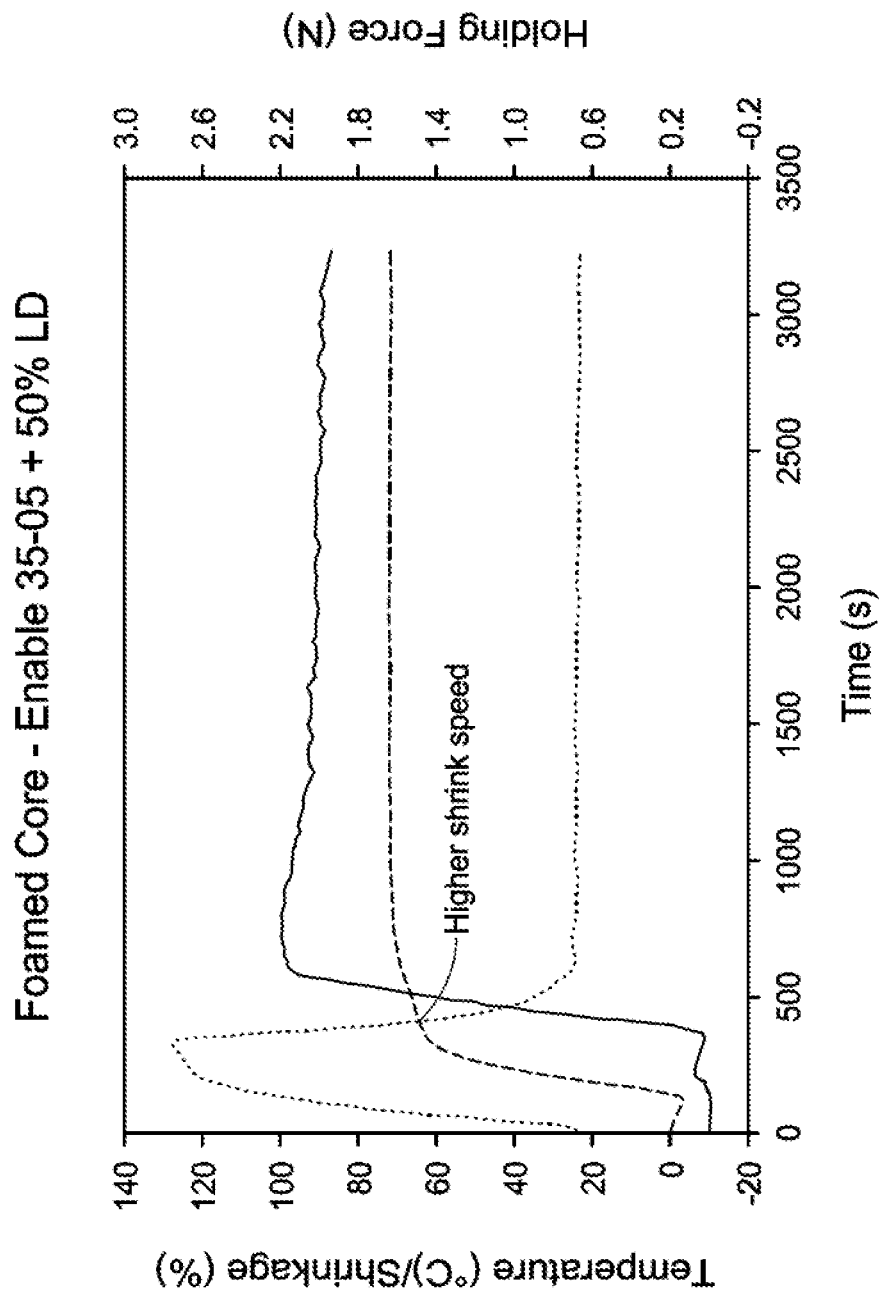
FIG. 2B are graphs the shrinkage percentages for a foamed core layer of Formulation 3 of Example II.

Multiple layer structures, each having a foamed core layer, were processed and compared with solid film. As shown in FIG. 2A and FIG. 2B, the foamed core provided positive shrink properties having potential market value for thermal isolation, frosted look, and rigid package.

Example III

A die gap 1.4 mm and output of 220 kg/hour and BUR 2.5 produced film formulations, Formulation 1 and Formulation 2, at the ExxonMobil Technology Center's POD blown film process line as follows:

Formulation 1

| | | |
|---|---|---|
| Skin: | Enable 20-05HH | |
| Solid Core: | Exceed XP 6026 | 40% LD165BW1 |
| | (EXP 606 0.2M1, 0.916d) | |

Formulation 2

| Formulation 2-75 GSM | | | |
|---|---|---|---|
| Skin: | Enable 25-05HH | | |
| Foamed Core: | Exceed XP 6026 (EXP 606 0.2M1, 0.916d) | 40% LD165BW1 | 3% foaming agent |

Figure 3:
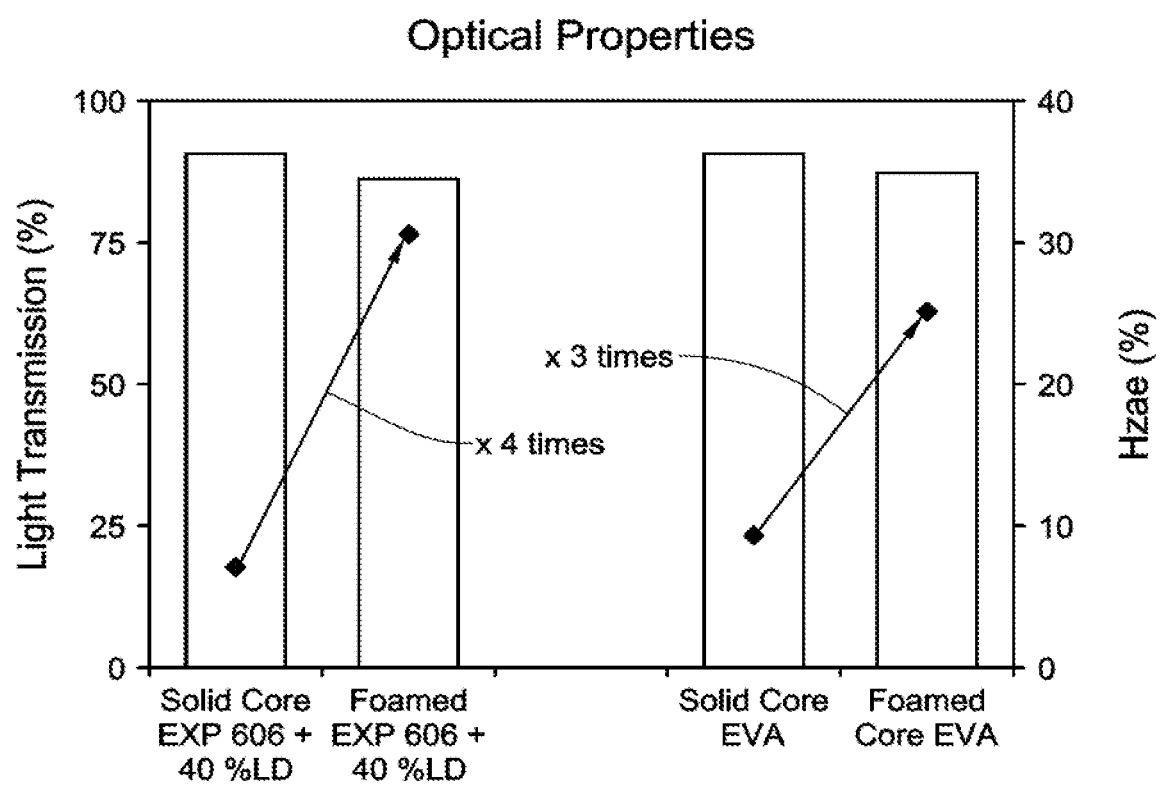
FIG. 3 graphs the optical properties of a solid core layer and a foamed core layer of Formulations 1 and 2 of Example III.

A foam film multiple layer structure having a foamed core layer was compared with solid film. As shown in FIG. 3, the film of Formulation 2 resulted in positive light diffusion properties.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A multilayer foam film comprising a core layer and two skin layers,
    (i) the core layer comprising the product of the combination of an LDPE composition, at least one blend partner and at least one foaming agent; and
    (ii) the two skin layers each independently comprising the product of the combination of an ethylene copolymer and at least one additive; wherein:
    the at least one blend partner comprises a first metallocene polyethylene composition comprising units derived from ethylene and at least one alpha olefin having at least 5 carbon atoms, the polyethylene composition having:
    a density of 0.910 g/cm$^3$ to 0.940 g/cm$^3$;
    a melt index $I_{2.16}$ of from about 0.2 g/10 min. to about 0.50 g/10 min.;
    a composition distribution breadth index (CDBI) of at least 70%; and
    a branching index g'$_{vis}$ of from 0.87 to 0.97;
    the ethylene copolymer comprises a second metallocene polyethylene composition comprising units derived from ethylene and of from 1 wt. % to 6 wt. % of a C$_3$ to C$_{20}$ comonomer, based upon the weight of the copolymer, the ethylene copolymer having:
    a density of 0.915 g/cm$^3$ to 0.930 g/cm$^3$;
    a melt index $I_{2.16}$ of from about 0.5 g/10 min. to about 5.0 g/10 min.; and
    a composition distribution breadth index (CDBI) of at least 60% to 80%;
    the core layer comprises from 40 to 50 percent by weight of the LDPE composition, based upon the total weight of the core layer; and the core layer is disposed between the two skin layers; and
    wherein the multilayer foam film further comprises two sub-skin layers and each of which disposed between the core layer and the skin layer, and wherein at least one of the sub-skin layers comprises a high density polyethylene composition having a density of about 0.961 g/cm$^3$.

2. The multilayer foam film of claim 1, wherein the LDPE composition has a density of about 0.922 g/cm$^3$ and a melt index $I_{2.16}$ of about 0.33 g/10 min.

3. The multilayer foam film of claim 1, wherein the core layer comprises about 3 percent by weight of the at least one foaming agent, based upon the total weight of the core layer.

4. The multilayer foam film of claim 1, wherein the high density polyethylene composition has a melt index (MI) of about 0.7 g/10 min.

5. The multilayer foam film of claim 1, wherein the multilayer foam film has a bending stiffness from about 32 to about 45 mN/mm.

6. The multilayer foam film of claim 1, wherein the multilayer foam film has a machine direction tensile strength from about 25 to about 35 N.

7. The multilayer foam film of claim 1, wherein the multilayer foam film has a transverse direction tensile strength from about 15 to about 30 N.

8. The multilayer foam film of claim 1, wherein the multilayer foam film has a 1% secant modulus from about 9 to about 14 N.

9. The multilayer foam film of claim 1, wherein the multilayer foam film has an Elmendorf Tear in the machine direction from about 115 to about 350 grams-force.

10. The multilayer foam film of claim 1, wherein the multilayer foam film has an Elmendorf Tear in the transverse direction from about 600 to about 1400 grams-force.

11. The multilayer foam film of claim 1, wherein the multilayer foam film has a puncture resistance from about 15 to about 60 N.

12. The multilayer foam film of claim 1, wherein the multilayer foam film has a dart drop from about 20 to about 80 grams.

13. The multilayer foam film of claim 1, wherein the core layer has a light transmission percent of at least about 75 percent.

14. The multilayer foam film of claim 1, wherein the at least one additive is an activator and/or a nucleator.

15. The multilayer foam film of claim 1, wherein the at least one foaming agent is a physical foaming agent or a chemical blowing agent.

16. A method of making the multilayer foam film of claim 1, the method comprising the steps of preparing the core layer comprised of an LDPE composition, at least one blend partner, and at least one foaming agent, and processing the core layer between two skin layers and two sub-skin layers, wherein each of the sub-skin layers is disposed between the core layer and each of the skin layers.

17. The method of claim 16, wherein the at least one additive is an activator and/or a nucleator.

18. The method of claim 16, wherein the at least one foaming agent is a physical foaming agent or a chemical blowing agent.

* * * * *